Feb. 27, 1940.     R. H. KRESS     2,191,669
LIQUID AUTOMOBILE CLUTCH CONTROL
Filed Aug. 6, 1935     4 Sheets—Sheet 1
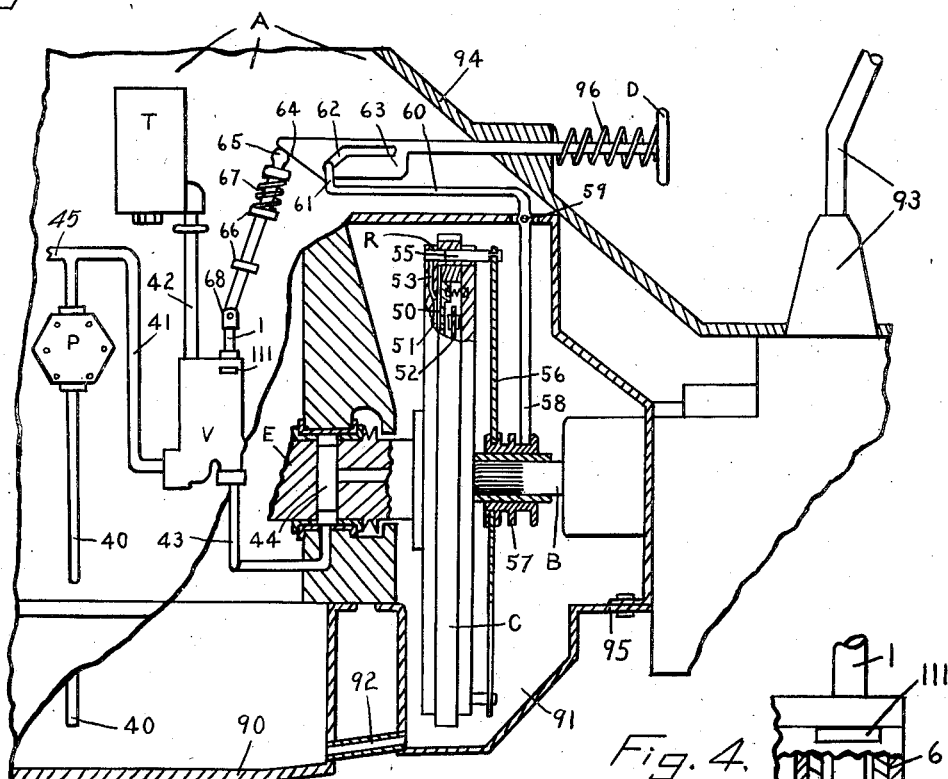
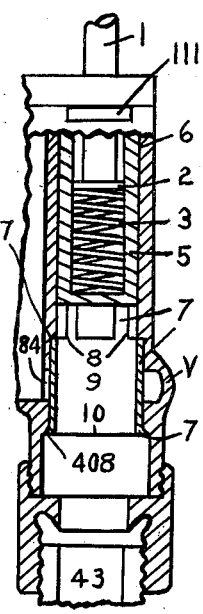
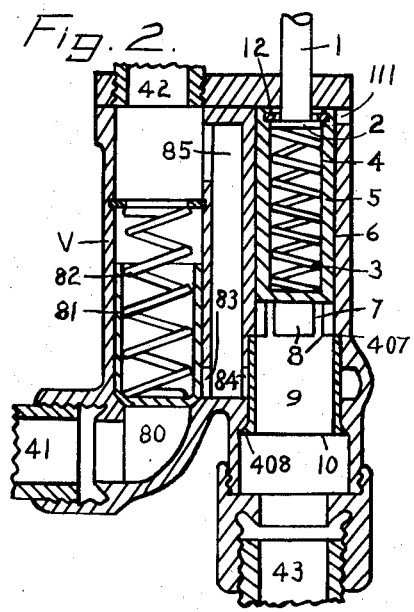
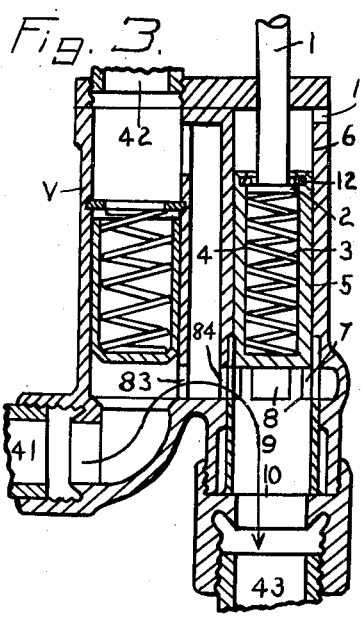
INVENTOR.
Ralph H. Kress
BY
Gardner W. Pearson
ATTORNEY.

Feb. 27, 1940.  R. H. KRESS  2,191,669
LIQUID AUTOMOBILE CLUTCH CONTROL
Filed Aug. 6, 1935  4 Sheets-Sheet 3
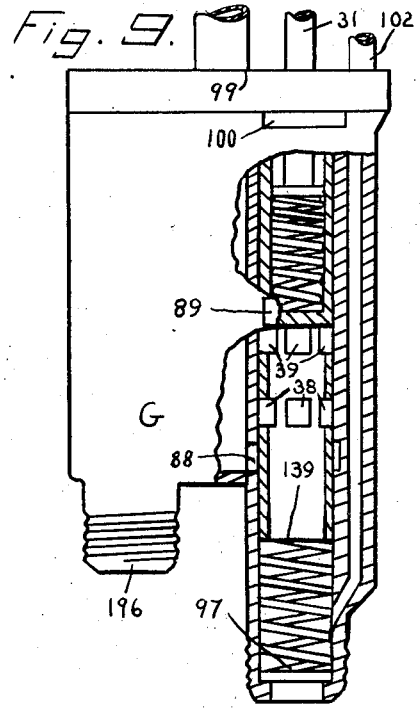
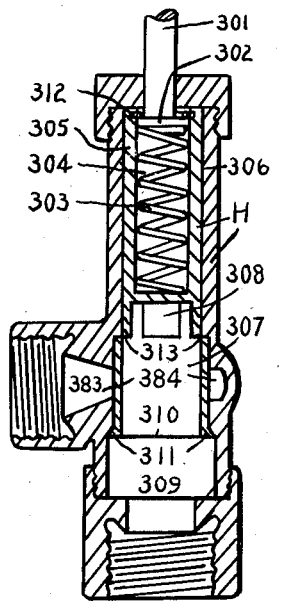
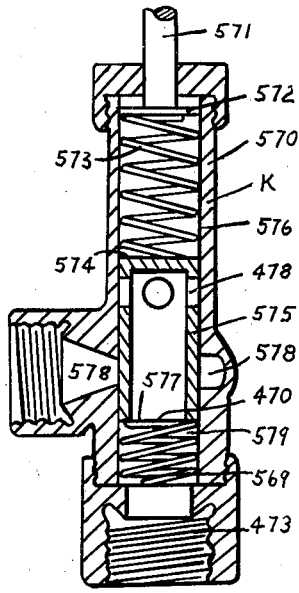
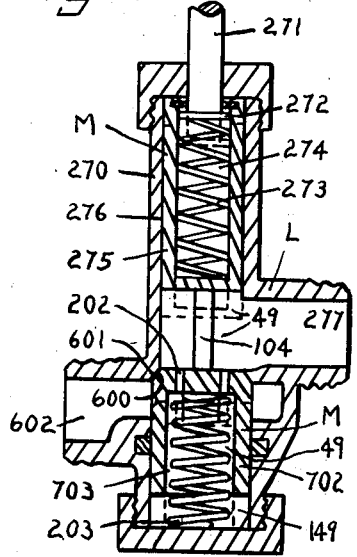
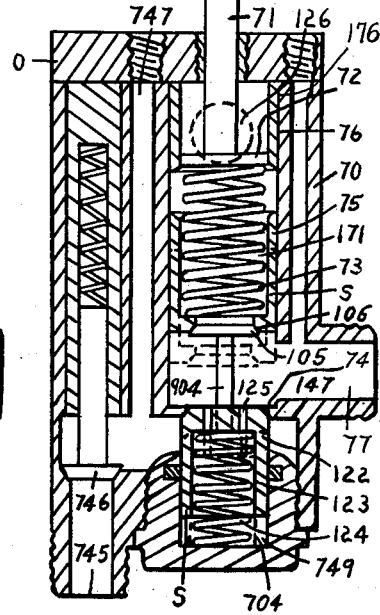
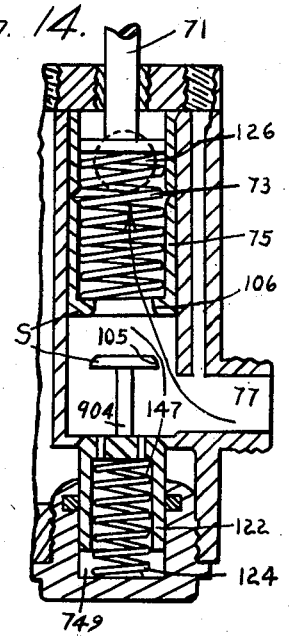
INVENTOR
Ralph H. Kress
BY Gardner W. Pearson
ATTORNEY.

Feb. 27, 1940.     R. H. KRESS     2,191,669
LIQUID AUTOMOBILE CLUTCH CONTROL
Filed Aug. 6, 1935     4 Sheets-Sheet 4
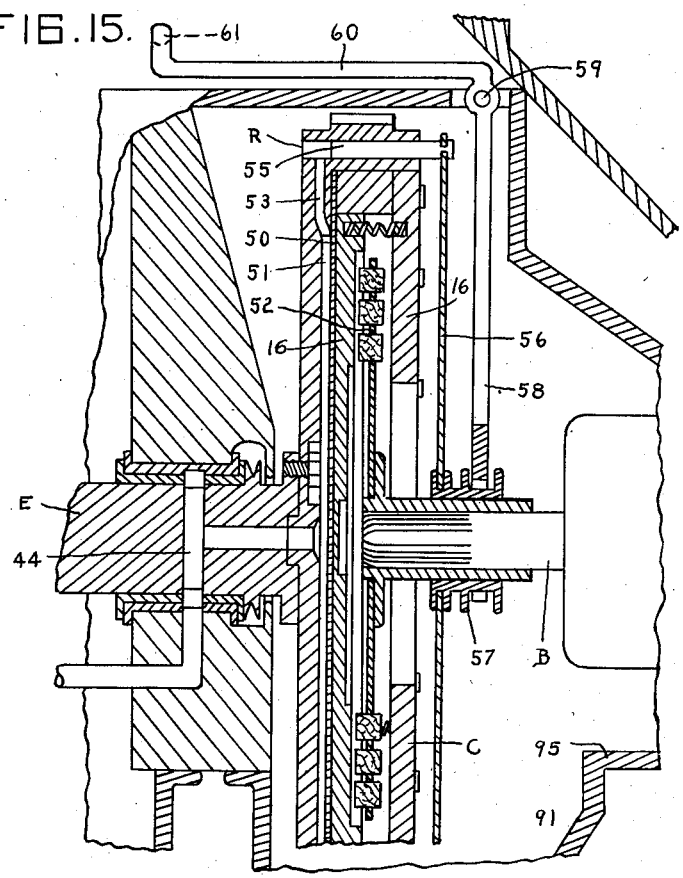
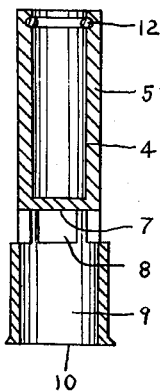
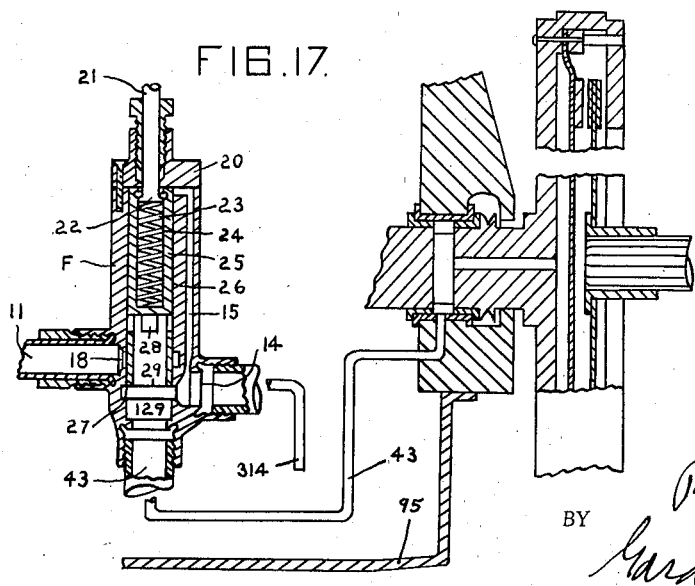
INVENTOR.
Ralph H. Kress
BY Gardner W. Pearson
ATTORNEY.

Patented Feb. 27, 1940

2,191,669

UNITED STATES PATENT OFFICE 2,191,669

LIQUID AUTOMOBILE CLUTCH CONTROL

Ralph H. Kress, Lawrence, Mass., assignor to Patent Protection Corporation, Lowell, Mass., a corporation of Massachusetts, trustee Application August 6, 1935, Serial No. 34,915

12 Claims. (Cl. 192—85)

This invention relates to valves for controlling liquid operable clutches for automobiles.

It is especially applicable to clutches of the diaphragm or central piston type such as shown and described in my application for United States Letters Patent on Rim release oil clutch, filed September 28, 1934, Serial No. 745,878, in which reference is made thereto. This application contains common subject matter with that application. For safe and practical operation, a control valve of the type indicated in said application and in this application is highly desirable, even necessary, for the satisfactory operation of such a clutch.

While a control valve of this sensitive type might be used to control a mechanical or pneumatic clutch, it is particularly desirable in the operation of a liquid clutch because liquid is not compressible and has a tendency to respond too quickly and harshly to any movement of a control button.

The main feature of the valve is to admit and hold steady any desired amount of pressure even to the fraction of a pound per square inch and to properly hold a liquid operable clutch in a partially engaged position when necessary for slow starting or parking or when it is necessary to move the car slightly.

I use a sliding plug with lateral inlet ports so located that there is no pressure from the inlet to make it hard to open the valve but the plug is of such type that practically its end or some other part is wholly exposed to back pressure in a chamber connected to the outlet, this pressure being in a direction opposite to a plug spring and tending to so move the plug as to close the inlet port or ports.

This plug regulating spring is of the compression type and is located in a dead end recess in the top or head of the plug with one end resting against the dead end of the recess and the other end against the end or head of a control rod which is movable inside the dead end recess.

There will be substantially no back pressure on the plug if the liquid outlet from the clutch is open, but when it is closed and the inlet open, the pressure from the pump compresses the clutch springs, the diaphragm, or its equivalent, in one direction and forces the plug back against the spring in the other direction until the inlet ports are closed. The pressure of the trapped liquid is transmitted from the clutch back to the plug and from leakage, jarring and other causes, the plug moves the regulating spring to a certain limited amount. When the trapped liquid is released, the regulating spring moves the plug out to its normal position with reference to the control rod.

The advantages of this valve are that it is self-lubricating and, therefore, will not bind, and the arrangement of spring and piston or plug are such that the pressure, admitted through the ports, will automatically remain the same while the control button is in the same position.

The balancing of the back pressure against the plug working against the spring will cause the entry ports to open or close enough to compensate for whatever liquid leaks out through the moving parts or through the bearings.

By means of this valve and a suitable liquid pressure operable clutch, an automobile can be controlled with great accuracy and delicacy under such circumstances as getting into a narrow spot to park, pushing another car ahead, or in fact in all the various complicated situations which confront the driver of an automobile. In combination with a liquid operable clutch, it permits the driver to meet all situations which may occur in driving, to the best advantage.

The valve and ports can also be made large or small, but regardless of their size, their operation will be very delicate.

We are aware that there are other pressure regulating valves of the diaphragm type such as used on air brakes, but the construction of these valves is such as to require too much effort to operate them, making them unsatisfactory for delicate control of a clutch, especially where the control rod is connected to the accelerator.

While I find it very convenient to use a pneumatic pressure tank to provide a smooth and steady pressure, and particularly such a tank with a trap valve, and while I also prefer to use what is known as a gear pump, I can omit the tank with its trap valve and instead of a gear pump, can use a pump of the Root blower type or a reciprocating pump, as with my construction of valve, the parts will automatically move according to the position of the control rod and allow the desired pressure to build up and then retain such pressure in the clutch.

In my preferred construction, with the rim release oil clutch, the device acts as a one-way or non-return valve or valve which allows the liquid to pass through it and out through the release valve in the rim of the clutch, the rim valve and the control valve being suitably connected, but the same principle can be used and applied in a three-way valve wherein the liquid under pressure goes through certain ports and a conductor to engage the clutch and back through the same conductor but out through a different port to release the clutch. Such a clutch construction is shown in my patent to R. H. Kress, Oil pressure automobile clutch control, No. 1,938,914, issued December 12, 1933.

The same principle might also be used with a clutch operated by fluid pressure where there was no discharge either at the rim or through a three-way port.

The general principle of this valve is the use of a casing with a cylindrical bore in which a plug is slidable, such plug having extending in from its head a tubular spring recess in which is positioned a compression spring against which bears a head carried by the end of a control rod, the plug and casing being so made that when the rod is pushed, through its head and the spring, it moves the plug into a position where a port or ports in the plug will register with a lateral port or ports in the casing, thus permitting liquid under pressure to flow through the ports, through a back pressure chamber opposite the end of the plug, thence through a tube or passage to the clutch.

As liquid under pressure is admitted to the back pressure chamber, it tends to oppose the compression spring and, if the parts are properly arranged, finally forces back the plug, closing the entry ports and keeping them closed but retaining in the back pressure chamber and the connections to and in the clutch, liquid at a pressure which is determined by the strength of the plug spring and the position of the control rod and its head.

If there are any leaks, this back pressure is reduced so that the spring forces open the inlet ports allowing the pressure to again build up until these ports are again closed. The pressure against the clutch can, therefore, be perfectly regulated and retained at any amount which is determined by the position of the parts.

In the drawings, are shown the various positions of the plug, including the position with the inlet ports closed and the control rod retracted, and second, the position with the control rod depressed and held and the ports open, and the third position where the control rod is in the same position but the spring has been compressed by the back pressure, and the inlet ports are closed.

In the drawings, Fig. 1 is a side elevation, partly in section, of part of the engine, clutch and adjoining parts of an automobile with a valve of my preferred type in position and cooperating with a release valve and a clutch of a preferred type for cooperation with my control valve.

Fig. 2 is a vertical section of the valve shown in Fig. 1, the valve being shown as closed and the trap valve for the tank being shown as closed.

Fig. 3 is a view similar to Fig. 2, but with the trap valve for the tank open and the control valve partly open, the parts being in the position which they will assume when the control rod is first pushed down to open the valve.

Fig. 4 is a vertical section of part of the valve shown in Figs. 1, 2 and 3 after the back pressure has closed the inlet ports, leaving the outlet ports open.

Fig. 9 is an elevation partly in section of the valve shown in Figs. 7 and 8 with the parts in the adjusted position.

Figs. 10, 11 and 12 show different modifications, while

Figs. 13 and 14 show still another modification with the parts in different positions, some positions being exaggerated.

Fig. 15 is an enlarged transverse vertical sectional view showing parts of Fig. 1.

Fig. 16 is a vertical sectional view of a plug removed from the valve.

Fig. 17 is a detail elevation showing a valve of the type shown in Figs. 5 and 6 in a position with reference to the drip pan of an automobile.

Figure 5:
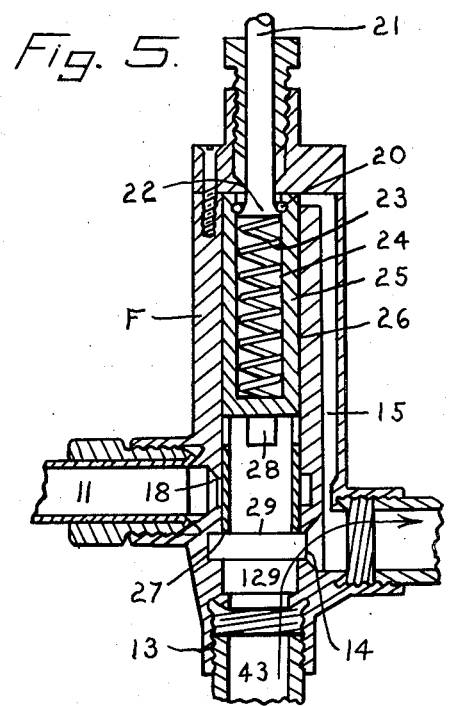
Fig. 5 is a vertical section of an alternative form of valve of the three-way type closed.

In the drawings, A represents the frame of an automobile with the usual motor, 90 being the motor oil drip pan and 95 the clutch housing with a drip pan 91, there being a return pipe 92 for oil from the clutch casing to the motor casing. 93 is a conventional gear shift and 94 a conventional foot board through which is a push button D, normally pressed outward by a spring 96.

E is an engine shaft which carries part of the clutch C, including chamber 51, diaphragm 50 and clutch plates 16, 16, operable by oil pressure from a pump P through the fluid connections 40, 41, 43 and 44, the latter of which is in the engine shaft E.

This clutch has a rim outlet 53 in which is a release valve R, including a plug 55 which is operable by an arm 56, carried by a collar 57, the collar being moved by a bell crank lever 58 pivoted to the clutch casing at 59 and having another arm 60 which terminates in a pin 61 which extends into a slot 62 in the head 63 of the push button D.

The end 64 of head 63 is so sloped that it so engages a connecting rod 65, slidable in guides 66, 66 and normally pressed outward by a spring 67 and connected by a pivot at 68 with the control rod 1 for the control valve V, that when control push button D is pushed in, it opens the ports of control valve V, permitting fluid, such as oil, under pressure to enter the chamber 51 behind the diaphragm 50, and at the same time closes the release valve R, the liquid under pressure in chamber 51 behind diaphragm 50, causing the clutch plates, 16, 16 to engage clutch plate 52 fixed on clutch shaft B and thereby connecting the clutch shaft B with the engine shaft E as described in my application for United States Letters Patent, Serial No. 745,878, pending herewith.

When the control push button D is released, its spring 96 and the spring 67 return the parts to their places, closing control valve V and opening release valve R, whereupon the oil or other fluid in chamber 51 is discharged through the release valve R.

The pump P sucks oil through pipe 40 from reservoir pan 90 and as shown, forces it through pipe 41 into the bore 80 in the casing of valve V, pushing back plug 81 against spring 82 and allowing the oil or other liquid under pressure to pass through the ports 83 and 84 or through the passage 85 up into pipe 42 into the tank T which is of the pneumatic type, containing compressed air whereby pressure is stored up for use, if and when pump P may not be working.

Pump P, as shown, is the usual oil pressure pump which forces oil to the bearings through pipe 45 but, of course, could be an independent pump, if desired.

Control valve V has a bore 6, which is shown as tubular, and connects with the pipe 43 which leads to the clutch and in this bore is slidable a plug 5 which has, as shown, a plurality of lateral ports 8, 8 which, when the plug 5 is pushed down from the position shown in Fig. 2 by the rod 1 to the position shown in Fig. 3, register with the lateral port or ports 84 in the plug casing, allowing liquid under pressure from pipe 41 to pass through ports 83 and 84, and thence through end or clutch port 10, with which lateral ports 84 they connect, and through the back pressure chamber 9 into the pipe 43, as shown by the arrow in Fig. 3, to engage the clutch.

Plug 5, as shown in Fig. 16, has in its upper part a tubular spring recess 4 in which the head 2, which engages compression spring 3, is slidable when pushed down by rod 1. As shown, this head 2 is locked in place by a ring 12 in such manner that when rod 1 is pulled up, as by spring 67, the plug 5 is pulled back as shown in Fig. 2.

When pressure is applied, as by the foot, to a control button D, rod 1 presses against spring 3, causing plug 5 to move from the position shown in Fig. 2 more or less, to the position shown in Fig. 3, and if there is pressure from the pump P, the fluid passes through the ports 83, 84, 8 and 10 and through the pressure chamber 9 into the clutch. When the clutch is fully or partly engaged as desired, the back pressure of the fluid in pressure chamber 9 against the bottom faces of the parts which form the end 7 of the plug 5 works against the spring 3, and so moves plug 5 that ports 8 are wholly or partly closed as shown in Fig. 4. The position of plug 5 is maintained at an equilibrium if the position of the button D is maintained, moving only if and when some of the liquid leaks out between any of the moving parts.

Figure 6:
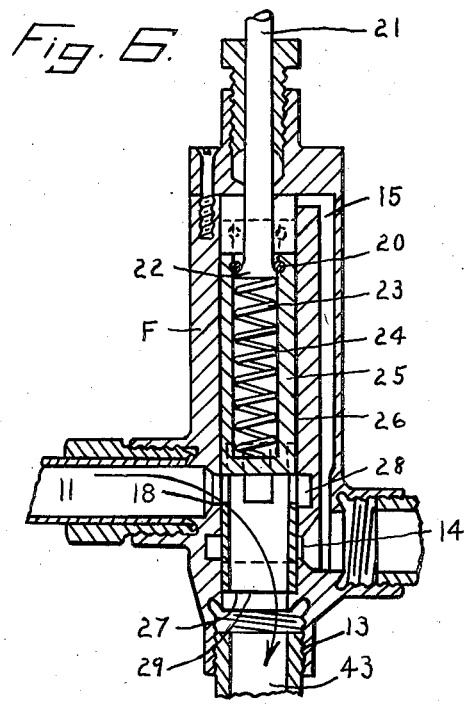
Fig. 6 is a view of the same valve with the ports fully open.

This movement of the valve plug 5 may appear exaggerated in Figs. 4, 5 and 6, as well as in Fig. 9, but as its diameter may be only 1 inch while the diameter of a diaphragm such as 50 may be 10 inches, the relative movement will be as the square of 1 inch to the square of 10 inches. In other words, a diaphragm movement of $\frac{1}{100}$ of an inch would mean a plug movement of 1 inch. Obviously, such a relationship cannot be accurately illustrated and the various views, particularly 4 and 9 are exaggerated.

Such a position is shown in Fig. 4, the spring 3 being compressed, but the head 2 and rod 1 remaining in their position, as held by the operator, the plug 5 including its ring 12 having been pushed up, closing ports 8 and 84 as shown. The strength of spring 3 and the position of rod 1 determine and regulate the pressure on the clutch.

A valve V, such as shown in Figs. 1, 2, 3 and 4, is what might be called a one-way or non-return valve, as the liquid always goes through in one direction as shown by the arrows and never returns through the valve. The port 111 is to provide free displacement and avoid vacuum in the bore 6 and spring recess 4.

Preferably I form plug 5 with two concentric seats 407 and 408 to prevent leaks when the valve is closed.

In Figs. 5 and 6 is shown a three-way slide valve F, operating on the same principle but in which the liquid passes into a tube 43 through the valve plug to the clutch and then when released, passes back through part of the valve and out a discharge port 14.

21 is the control rod having a head 22 inside of a ring 20 and bearing against a control compression spring 23 in a recess 24 in the plug 25. This plug 25 is slidable in a bore 26 and has a lateral port or ports 28 and an end or clutch port 29 which connects the lateral ports 28 with the end 27 when 28 registers with a lateral port 18 in the valve casing, allowing liquid to pass in through an inlet 11, which connects in any suitable way with a pressure tank or a pump or both, and thence out through the back pressure chamber 129, outlet 13 and tube 43 to the clutch.

When control rod 21 is depressed sufficiently to allow liquid to flow into the clutch pressure chamber, plug 25 closes the discharge port 14, and when pressure on control rod 21 is removed, plug 25 is pulled back or is pressed back by back pressure and moves the ports 28 and 18 out from registration, allowing the liquid to flow back through the discharge port 14 and pipe 314 into any suitable place, such as the motor drip pan 95, as shown in Fig. 17 and described in said Kress Patent No. 1,938,914.

15 represents a connecting by-pass to allow plug 25 to move freely in the bore 26 without being restrained by dead oil, vacuum or pneumatic pressure.

No pressure tank nor connection therewith is shown in Figs. 5 and 6, but this valve might be connected directly with a pump of any design.

In Fig. 5, the inlet ports are closed and clutch and discharge ports 29 and 14 are open. In Fig. 6, in full lines, inlet and clutch ports are open and the discharge port is closed, and in the dotted lines Fig. 6, inlet and discharge ports are closed but the clutch port is open, the parts being in the normal running position.

Figure 7:
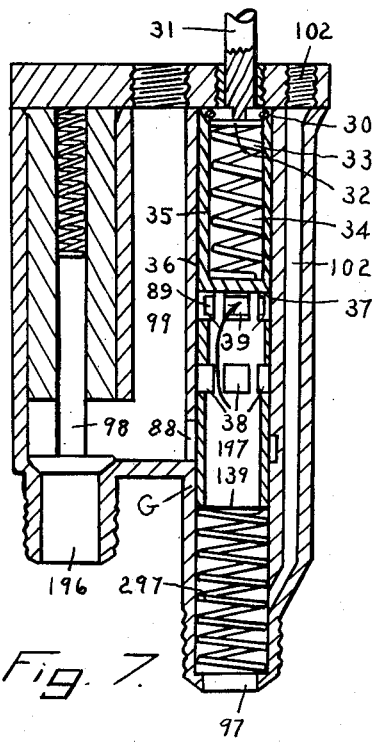
Fig. 7 is a vertical section of another valve of the three-way type with the inlet ports closed.
Figure 8:
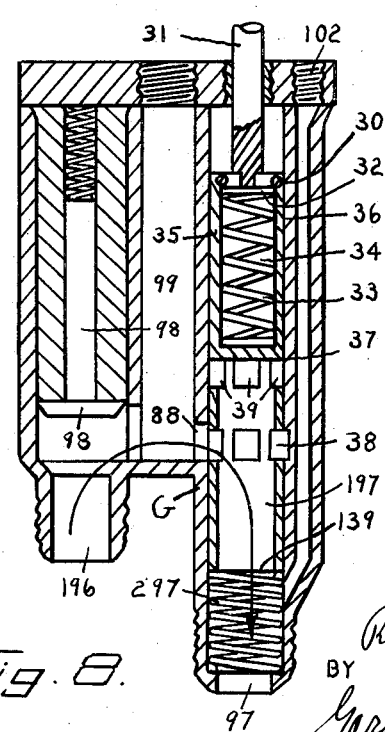
Fig. 8 is a view of the same valve with the inlet ports fully open.

In Figs. 7, 8 and 9 is shown another design of a three-way slide valve G in which 196 is the fluid inlet and 97 the fluid outlet, while 98 is a spring pressure trap valve which is lifted by the pressure of the fluid coming in through inlet 196, the passage 99 connecting with a pressure tank of any suitable design.

88 is a port which registers with the lateral port or ports 38 in valve plug 35 which is slidable in the bore 36, and is controlled by a spring 33 in recess 34 and the head 32 of a control rod 31, kept in place by a ring 30. 139 is an end or clutch port which connects with lateral ports 38.

37 is the bottom end of the plug 35 against which the back pressure in chamber 197 presses while 39 represents discharge ports which, when the plug is in a certain position, register with the casing discharge port such as 89 shown in Fig. 9.

When in the position shown in Fig. 8, the liquid passes through the passages 196, 88, 38, 139 and 97 to the clutch, but when the pressure on the rod 31 is released and it is returned to the position shown in Fig. 7 by any outside means or by return spring 297 carrying with it the plug 35, the back pressure from the clutch chamber forces the liquid back through the passage 97 and the port 139, then past the ports 38, which are closed, and out through the ports 39, and port 89 into any suitable place, such as the motor oil drip pan. This whole valve G may conveniently be located in the drip pan or a suitable conductor may pass from discharge port 89 into a drip pan.

Fig. 9 shows the ports 38 and 39 of valve plug 35 in a position which they assume while liquid pressure against a diaphragm is being held constant and they do not register with either the casing port 88 or the discharge ports 89.

102 is a connection for a pressure gauge, while 100 is a passage for oil from the top of the bore 36 to the outside to prevent the plug from binding.

Valve H in Fig. 10 is similar to valve V of Fig. 2 but there are no pressure tank connections. The rod 301 has a head 302, slidable in recess 304 against spring 303, in plug 305, and is held in place by a ring 312. Plug 305 is slidable in bore 306 and has lateral inlet ports 308, which connect with a clutch or end port 310, through end 307, and lateral inlet ports 308 are adapted to register with lateral casing ports 384 which connect with pressure inlet 383. 309 is the back pressure chamber and 311 and 313 are concentric seats to prevent leaks.

In Fig. 11 is shown a simplified type of valve K in which 570 is a valve casing with an inlet port 578 and with a bore 576 in which is slidable a plug 575 which has no spring recess but merely a top 574 and an end or clutch port 470 which connects with a plurality of lateral plug ports 478, adapted to register with casing inlet port 578.

Control rod 571 has a head 572 between which head and the plug top 574 is a compression spring 573. 577 represents the end of the plug and 579 the back pressure chamber which coincides with and is part of the connection 473 to the clutch.

In this construction, the plug 575 on the outside is a straight cylinder instead of having the two annular seats such as 407 and 408 in Fig. 2. The ports 478 are circular, there being no spring recess and no ring such as at 12, the back pressure from the clutch being depended upon to close the ports 578 and 478 when pressure is held on the rod 571 while a very light compression return spring 569 returns plug 575, spring 573 and head 572 to the normal closed position.

In Fig. 12 is shown at L, another modification in which the plug M is in two separate parts. 270 is the casing in which is a plug bore 276 for a plug M which comprises two parts, namely, the top part 275 in which is a recess 274 for a spring 273 against which bears a head 272 of control rod 271, and the lower part 702 which, as shown, is of cylindrical form and is upwardly pressed by a light returning spring 203 in a recess 703, which together with holes 202 the space 149 which is part of the lower part 49 of bore 276 constitutes a back pressure chamber.

This part 702 of the plug has a stem 104 upon which the upper part 275 of the plug M normally rests, and has holes 202 to equalize the back pressure through the clutch port 277 in the back pressure chamber, these two together forming what amounts to an end port for the whole plug 275 and 702 from which the back pressure always tends to lift the part 275 of the plug, while the spring 203 tends to hold the part 702 and stem 104 up against 275.

In this case, the top rim 600 of the part of the plug 702 and the corresponding part 601 of the casing serve the purpose of lateral inlet ports for the fluid pressure coming in through the inlet 602. When the control rod 271 with its head 272 and spring 273 are depressed, they carry down the whole plug M including the part 275, stem 104 and the part 702 as a unit, opening the inlet port between 600 and 601 and admitting liquid pressure to the clutch through the port 277.

When the rod 271 comes to rest and after a predetermined amount of liquid under pressure has gone into the clutch, the back pressure through chamber 49 pushes back the part 275, allowing spring 203 also to lift the part 702, thus closing the inlet port 600, 601 so that while of different design, this construction of valve works in the same way as the others.

In Figs. 13 and 14, the valve O shows a further modification of this last construction.

In Figs. 13 and 14, 745 is the passage from the pump or other device for producing liquid pressure and 746 is the trap valve to hold the pressure in a tank connected by the passage 747.

70 is the casing in which is a cylindrical bore 76 in which is slidable the part 75 of a compound plug S, which plug has a tubular spring recess 171 for a compression spring 73 against which bears the head 72 of a control rod 71. This head is slidable in the top part 176 of bore 76, the bore of which is reduced to the size of spring recess 171.

147 is a back pressure chamber which, as shown, includes the tubular part 704 in which is slidable the valve closure 122 shown as having a spring bore 123 for the return spring 124 which tends to push it upward against a seat 74 at the middle of pressure chamber 147. This pressure chamber 147, through a passage 77, connects with a liquid pressure clutch of any of the types described. Stem 904 is fixed to closure 122.

125 represents holes through the closure 122 whereby the back pressure of the liquid can get down into the bottom 149 of the back pressure chamber 147, and 904 is the stem of another closure 105 which is seated in a seat 106 at the bottom end of spring recess 171 in the upper part 75 of the plug S.

The plug S may be considered as including the parts 75, 122, 904 and 105, and when rod 71 is pushed down, its head 72 forces down the spring 73 and all the above parts of plug S, thereby pushing closure 122 from its seat 74. This opens the lateral inlet port, as shown by the dotted lines in Fig. 13, which is seat 74, from the source of pressure to the clutch. Rod 71 and spring 73 hold the inlet port open until the back pressure in the back pressure chamber 147, acting against closure 105 and the bottom end of the plug, compresses the spring 73 and closes the inlet port, as shown in full lines in Fig. 13. The position of parts 75 in plug S in Fig. 14 is exaggerated.

As thus described, this can and will act as a one-way non-return valve, but if it is desired to use it as a three-way valve, it may be provided with a discharge port 126 which can be used by so adjusting the control rod 71 that when released, instead of remaining in the position shown in Fig. 13, it will take the position shown in Fig. 14, the result of which is that the back pressure lifts the part 75 of the plug from the closure 105 allowing the liquid to be discharged through seat 106 up through spring 73 and out through discharge port 126.

The purpose of this combination liquid clutch and valve is to allow an automobile operator to depress a control button more or less, to hold it until the regulating spring in that position balances the liquid pressure admitted through the inlet ports which are then closed by the back pressure, and to have all the parts return to the normal closed position when the foot is removed from the button. There should be no appreciable fluid back pressure when the inlet ports are being opened, but there should be either a head on the end of the control rod together with a ring in the head of the plug to pull back the plug as described on page 9, paragraph 1, or some sort of light returning spring such as 297, shown in Figs. 7, 8 and 9, or 569 in Fig. 11, or 203 in Fig. 12, or 124 in Figs. 13 and 14. Any of such means or other means may be used to normally keep the inlet ports closed.

With some types of clutches and with a three-way valve, the elasticity of the clutch diaphragm or of its returning spring, might push back the plug to open the discharge ports when the foot was removed from the control rod. In such cases, the diaphragm parts would be the means to normally keep the inlet ports closed, but it is better to have some sort of light returning spring.

I claim:

1. The combination in an automobile; of a liquid operable clutch including a liquid pressure chamber and a movable clutch member operable by liquid pressure in said chamber to force the clutch members together against elastic mechanical means forming part of the clutch, said chamber being connected by conductors with a source of liquid pressure and a pressure storage tank, said chamber having a discharge port controlled by a discharge valve; with a control valve interposed in said conductors, said control valve including a casing in which is a cylindrical bore having a lateral casing inlet port from the source of pressure, and an axial pressure chamber leading to the clutch liquid pressure chamber, a plug slidable in the cylindrical bore having a regulating spring recess in its head and an axial outlet port in its foot leading to the axial pressure chamber, and a lateral inlet port through the side of the plug leading to the outlet port in position and size to register with the lateral casing inlet port; a regulating compression spring positioned in the spring recess; a control rod which engages the regulating spring; and control means to open and close the discharge valve and the control valve, including means to normally keep the discharge valve open and the control valve closed.

2. The combination in an automobile; of a liquid operable clutch including a liquid pressure chamber and a movable clutch member operable by liquid pressure in said chamber to force the clutch members together against elastic mechanical means forming part of the clutch, said chamber being connected by conductors with a source of liquid pressure, and having a discharge port controlled by a discharge valve; with a control valve interposed in said conductors, said control valve including a casing in which is a bore having a lateral casing inlet port from the source of pressure, and an axial pressure chamber at one end of the bore leading to the clutch liquid pressure chamber, a plug slidable in the bore having a head and a lateral inlet port through the side of the plug leading to the axial pressure chamber and in position and size to register with the lateral casing inlet port; a regulating compression spring which engages the plug head; a control rod which engages the regulating spring; and control means to open and close the discharge valve and the control valve including means to normally keep the discharge valve open and the control valve closed.

3. The combination in an automobile; of a liquid operable clutch including a liquid pressure chamber and a movable clutch member operable by liquid pressure in said chamber to force the clutch members together against elastic mechanical means forming part of the clutch, said chamber being connected by conductors with a source of liquid pressure; with a control valve interposed in said conductors, said control valve including a casing in which is a bore having a lateral casing inlet port from the source of pressure, and an axial pressure chamber at one end leading to the clutch liquid pressure chamber, a plug slidable in the bore having a head and a lateral inlet port through the side of the plug leading to the axial pressure chamber and in position and size to register with the lateral casing inlet port; a regulating compression spring which engages the plug head; a control rod which engages the regulating spring; and control means to open and close the control valve including means outside the valve to normally keep it closed.

4. The combination; of a liquid operable clutch including a liquid pressure chamber and a movable clutch member operable by liquid pressure in said chamber to force the clutch members together against elastic mechanical means forming part of the clutch, said chamber being connected by conductors with a source of liquid pressure; with a control valve casing interposed in said conductors, said control valve casing including a bore having a lateral casing inlet port from the source of pressure, and an axial pressure chamber at one end leading to the clutch liquid pressure chamber; a plug slidable in the bore having a head and a lateral inlet port through the side leading to the axial pressure chamber and in position and size to register with the lateral casing inlet port; a regulating compression spring which engages the plug head; a control rod which engages the regulating spring; and control means to open and close the control valve including means outside the valve to normally keep it closed.

5. The combination; of a liquid operable clutch including a liquid pressure chamber and a movable clutch member operable by liquid pressure in said chamber to force the clutch members together against elastic mechanical means forming part of the clutch, said chamber being connected by conductors with a source of liquid pressure; with a control valve interposed in said conductors, said control valve including a casing in which is a bore having a lateral casing inlet port from the source of pressure and a discharge port, an axial pressure chamber at one end leading to the clutch liquid pressure chamber, a plug slidable in the bore and having a head, a clutch port in its foot leading to the axial pressure chamber, lateral inlet and discharge ports through the side of the plug, both arranged to connect with the axial pressure chamber and respectively in position to engage the lateral casing inlet and discharge ports; a regulating compression spring which registers with the plug head; a control rod which engages the regulating spring; and control means to open and close the control valve including means outside the valve to normally keep it closed.

6. The combination; of a liquid operable clutch including a liquid pressure chamber and a movable clutch member operable by liquid pressure in said chamber to force the clutch members together against elastic mechanical means forming part of the clutch, said chamber being connected by conductors with a source of liquid pressure; with a control valve interposed in said conductors, said control valve being of the slide plug type and having inlets connecting with the source of pressure, the inlet ports being of such character that no liquid pressure must be overcome in opening them, and having a pressure chamber connected through the conductors with the clutch liquid pressure chamber and in such position that back pressure therefrom will tend to move the plug against a compression spring forming part of the valve to close the inlet ports; and control devices including a rod which engages said spring and means outside the valve to normally keep the inlet ports closed.

7. The combination in an automobile; of a liquid operable clutch including a liquid pressure chamber and a movable clutch member operable by liquid pressure in said chamber to force the clutch members together against elastic mechanical means forming part of the clutch to produce back pressure, said chamber being connected by conductors with a source of liquid pressure; with a control valve interposed in said conductors, said control valve being of the slide plug type and having inlet ports connecting with the source of pressure, the inlet ports being of such character that no liquid pressure must be overcome in opening them, and having a pressure chamber connected through the conductors with the clutch liquid pressure chamber and in such position that back pressure therefrom will tend to move the plug against a compression spring forming part of the valve to close the inlet ports; and control devices including a rod which engages said spring.

8. The combination in an automobile; of a liquid operable clutch including a liquid pressure chamber and a movable clutch member operable by liquid pressure in said chamber against an axially disposed elastic diaphragm, said chamber being connected by a conductor with a source of liquid pressure; with a control valve interposed in said conductor, said control valve including a casing having a side port which connects at one end with the source of liquid pressure and at the other end with a bore in which is a slidable plug with a passage through an end port connecting with the clutch liquid pressure chamber and through a plug side port connecting with the casing side port and the source of liquid pressure; a regulating compression spring which engages the other end of the plug; a control rod which so engages the regulating spring and the plug as to compress the spring and to so move the plug as to allow liquid under pressure to pass through the side ports and end port into the clutch and to pull back the plug and to close the side ports when moved in the other direction; and control means to move the control rod and plug including means outside the valve to normally keep the side ports closed.

9. A valve for controlling oil pressure comprising a casing in which is a bore in which is slidable a plug having an end discharge port connecting with a side inlet port, a port leading through the side of said casing bore and communicating at one end with an oil pressure pump and at the other end with the side port in the plug, one end of the bore communicating with the end port in the plug and with an oil pressure operable clutch which includes mechanical elastic means to create back pressure against one end of the plug, a regulating compression spring which engages the other end of the plug, and control means including a rod which engages the other end of the regulating spring and means outside the valve which tend to so pull the plug and spring as to keep the side ports normally closed.

10. A control valve including a casing in which is a bore from which is a lateral casing inlet port which leads to a source of liquid pressure and an axial pressure chamber at one end which connects with the liquid pressure chamber of a liquid operable clutch or like device which includes elastic mechanical means to produce back pressure in said chamber, a plug slidable in the bore, said plug having a closed head and a lateral liquid inlet port through the side of the plug, which inlet port leads to the axial pressure chamber and is in a position and of a size to register with the lateral casing inlet port, a regulating compression spring which engages the plug head, a control rod which engages the regulating spring; and means outside the valve to operate the control rod including means to normally keep the liquid inlet port of the casing and the casing inlet port out of engagement.

11. A control valve including a casing in which is a bore from which is a lateral casing inlet port which leads to a source of liquid pressure and an axial pressure chamber at one end which connects with the liquid pressure chamber of a liquid operable clutch or like device which includes elastic mechanical means to produce back pressure in said chamber, a plug slidable in the bore, said plug having a closed head and a lateral liquid inlet port through the side of the plug, which inlet port leads to the axial pressure chamber and is in a position and of a size to register with the lateral casing inlet port, a regulating compression spring which engages the plug head and a control rod which engages the regulating spring.

12. In a liquid pressure control device, the combination of a liquid operable clutch which includes an elastic diaphragm of relatively large diameter and other elastic mechanical means to produce back pressure in a pressure tube; with a control valve including a casing in which is a bore from which is a lateral casing inlet port which leads to a source of liquid pressure and an axial pressure chamber one end of which connects with the pressure tube, there being a plug slidable in the casing bore, said plug having a closed head and a lateral liquid inlet port through one side, which inlet port leads to the axial pressure chamber and is in a position and of a size to register with the lateral casing inlet port; a regulating compression spring between the plug head and a control rod; said control rod which engages the regulating spring; means to operate the control rod, including means to normally keep the liquid inlet port of the plug and the casing inlet port out of engagement; and said source of liquid pressure.

RALPH H. KRESS.